United States Patent [19]

Kallies et al.

[11] 4,248,830

[45] Feb. 3, 1981

[54] DEVICE FOR MICROBIOLOGICAL TESTING

[75] Inventors: Karl-Heinz Kallies; Manfred Winkler, both of Sebnitz, German Democratic Rep.

[73] Assignee: Veb Arzneimittelwerk Dresden, Radebeul, German Democratic Rep.

[21] Appl. No.: 59,679

[22] Filed: Jul. 23, 1979

[30] Foreign Application Priority Data

Jul. 25, 1978 [DD] German Democratic Rep. .... 206901

[51] Int. Cl.[3] .......................... G01N 1/48; B01L 3/00

[52] U.S. Cl. ...................................... 422/59; 422/100; 422/104; 73/425.4 P

[58] Field of Search ..................... 422/58, 59, 100, 99, 422/119, 104, 34; 73/425.4 P, 425.6; 252/408

[56] References Cited

U.S. PATENT DOCUMENTS

| | | | |
|---|---|---|---|
| 1,589,056 | 6/1926 | Drummond | 422/100 |
| 1,762,807 | 6/1930 | Arnold | 422/100 |
| 2,398,737 | 4/1946 | Elliot et al. | 73/425.4 P |
| 2,930,238 | 3/1960 | Kellett | 73/425.4 P |
| 3,093,242 | 6/1963 | Huyk et al. | 422/34 |
| 3,748,909 | 7/1973 | Kuo | 422/100 |
| 4,007,639 | 2/1977 | Hackel | 73/425.4 P |
| 4,011,685 | 3/1977 | Boyd et al. | 422/100 |
| 4,117,728 | 10/1978 | Johnson | 422/100 |

FOREIGN PATENT DOCUMENTS

| | | | |
|---|---|---|---|
| 2389134 | 11/1978 | France | 422/58 |
| 228545 | 11/1943 | Switzerland | 422/104 |

OTHER PUBLICATIONS

Windholtz, M., et al., Editors, The Merck Index, Ninth Edition, Merck and Co., Inc., 1976, pp. 7929, 5936, 9406.

*Primary Examiner*—William F. Smith
*Assistant Examiner*—Chris Konkol
*Attorney, Agent, or Firm*—Michael J. Striker

[57] ABSTRACT

A micro test tube adapted for use in carrying out microbiological determinations, and being especially adapted for detection of bacteria in body fluids such as milk and urine comprising a capillary tube which increases in diameter at one end thereof to form a small generally cylindrical sample tube, sealing means for sealing the open ends of the capillary and sample tubes and movable sealing means such as a bead or needle for sealing off the passage between the capillary and sample tube portions of the micro tube, the sealing means sealing for the open end of the sample tube being selected to serve as aspirator means for delivering the sample into the tube and the sealing means for sealing the capillary being selected to also serve as a stand for the micro test tube.

7 Claims, 2 Drawing Figures

DEVICE FOR MICROBIOLOGICAL TESTING

BACKGROUND OF THE INVENTION

This invention relates to a micro test tube for carrying out microbiological determinations and which is especially adapted for detection of bacteria in body fluids such as for example milk, urine and the like.

An object of this invention is to provide a micro test tube which is readily, easily and reliably sterilized and which further serves as the vehicle for delivering the sample therein as well as for holding the sample so that the test procedure can be run without any transfer of materials being necessary, all this while sterile conditions are maintained.

Another object of the invention is to provide such a micro test tube which is self-contained, i.e. wherein no additional apparatus or materials are required other than introduction of the sample to be evaluated.

A further object of the invention is to provide a micro test tube which is made available in a "ready to use" condition, i.e. completely sealed against contamination by external organisms as well as loss of the analytical sample or test liquid.

Still a further object of the invention is the provision of such a micro test tube which can be used for delivering the sample therein and which can then be placed intact in an incubator for incubating the sample.

Figure 2:
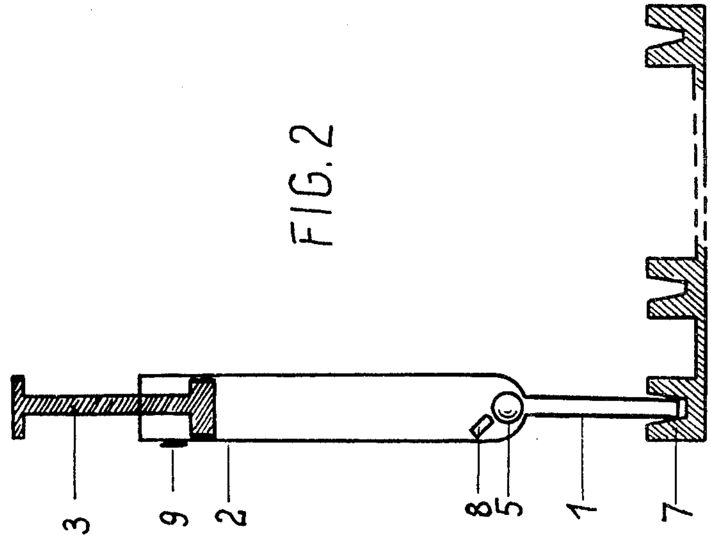
Figure 1:
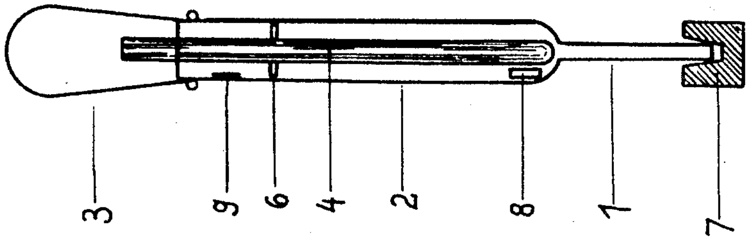

These and other objects and advantages of the invention will be apparent from a consideration of the following description and drawings in which:

FIG. 1 diagrammatically shows a micro test tube in accordance with the invention, provided with a needle, rubber aspirator and a single sealing cap; and FIG. 2 diagrammatically shows another embodiment of a micro test tube in accordance with the invention provided with a spherical bead, pressure aspirator, sealed and supported in a flat platform constructed for sealing and holding upright a plurality of such tubes.

It is known to use suitable color or dye solutions such as triphenyltetrazalium (TTC), Resazurin, methylene blue, etc. to determine the bacterial content in body fluids. To this end, the dye or color solution is provided under sterile conditions (or germ free condition) in suitable small or micro test tubes. This can take place by delivering the dye solution in calculated amount by means of a syringe or pipette into the tube. Thereafter the fluid to be investigated is delivered by the same technique into the tube and the two substances mixed together (DE-OS No. 25 36 097, DE-OS No. 25 38 014).

It has also been proposed that the dyestuff be used in tablet or powder form and in some cases applied to a carrier such as a paper strip. In these cases (DD-PS No. 75 153, DD-PS No. 101 759, DE-AS No. 19 41 370), the tablet, a calculated amount of the powder or the test strip is first introduced into the micro test tube and then the solution to be tested is delivered and mixed with the dyestuff. Thereafter the micro test tubes are incubated for a predetermined period of time and then evaluated. In order to seal the tubes, there is used either cotton wadding or a special closure or cap so that during the incubation, the reaction taking place is not influenced by foreign contaminants, i.e. bacteria, gases and the like. When it is necessary to carry out a study or research investigation involving a special population or group, as for instance infants in a nursery or milk cattle in a dairy, the aforedescribed processes are not particularly suitable in that under the conditions prevailing in such a study, a considerable amount of manual work is required as well as a large supply of micro test tubes, dyestuffs (solutions, powders, tablets, strips), pipettes, sealing means, racks and the like. All of these manipulations and materials must be carried out and supplied under germ free—sterile conditions.

The micro test tube of the invention avoids all of the disadvantages associated with the known devices by providing a micro test tube which is easily sterilized and which serves simultaneously for obtaining the sample, as a containment and incubation vehicle, under maintenance of the sterility without any additional apparatus or equipment being required such as pipettes or racks. The micro test tube of the invention can be used with a dyestuff in powder, tablet, paper strip form and is sealed against any outside contamination or loss of contents. Most important, the micro test tube of the invention is provided in a prepared or ready for use condition.

The device or micro test tube of the invention comprises a capillary tube capable of forming a flow passage, the cross-section or diameter of which increases to form a small generally cylindrical sample tube having a continuous flow passage with said capillary. The small sample tube contains in one embodiment of the invention, a small spherical bead whose diameter is larger than that of the capillary so that it remains in the small tube and acts as a seal for sealing off the flow passage therebetween. The spherical bead, the capillary and the small tube can be made of glass or a suitable transparent plastic material.

In accordance with another embodiment of the invention, the small tube contains in place of the spherical bead, a needle made of plastic or glass which at its end adjacent the capillary portion of the micro test tube is rounded. The length of the needle is greater than that of the small sample tube so that it extends from the open end of the tube opposite the capillary. The cross-section or diameter of the needle is also greater than that of the capillary so that it is retained within the small tube and can serve as a seal for sealing off the flow passage between the capillary and the small sample tube.

The small sample tube additionally contains a dyestuff, i.e. tablet, powder, carrier provided with dyestuff, said dyestuff being capable of reaction with the bacteria in the test sample to provide a detectable change. The open end of the small tube is sealed with an aspirator while the capillary's open end is sealed with a wood or plastic closure in the form of a cap which is constructed so that it acts as a stand for the micro test tube. Preferably the wood or plastic closure is constructed so that it serves the aforesaid purposes for a plurality of the micro test tubes.

The micro test tube (capillary and sample portion) in accordance with the invention is made of glass or a glass-clear synthetic inert plastic.

The capillary portion of the tube is about 25–50 mm long and has a diameter of about 1–3 mm.

The sphere which rests in the semispherically-shaped enlargement forming the base of the sample tube, and which serves as a sealing means, i.e. valve for sealing off the passage between the capillary and sample tube is also made of glass, metal or a synthetic inert plastic and has a diameter of about 1.5–8 mm.

The capillary widens out into a generally cylindrical sample tube having a length of about 20–70 mm and a diameter of about 5–10 mm. At the open end portion of the small tube (farthest from the capillary), there is arranged a natural or synthetic rubber bulb or a pressure aspirator, that is so chosen that a suitable volume of the fluid to be examined in the particular test procedure can be drawn into the tube in a single operation or manipulative step.

Instead of the spherical bead, there can be provided in the sample tube, a plastic, metal or glass needle, which is made longer than the incubation volume of the small tube and which serves as a seal for sealing off the flow passage between the capillary and the sample tube and also as an inoculation needle should such use be indicated. The needle preferably has a length of 60–80 mm and is constructed to be longer than the sample tube.

The diameter of the needle is so selected that after aspiration of the test fluid into the sample tube, the sample tube portion is sealed off from the capillary portion. The diameter of the needle is about 1.5–8 mm and is selected so that it will serve as a sealing means sealing off the passage between the capillary and the sample tube. The length of the needle is chosen so that the needle at its end (opposite its sealing end) reaches into the rubber aspirator. The needle is provided with a resilient collar for holding and maintaining the needle in a predetermined central position within the sample tube. The needle is removably inserted into the sample tube, so that if a positive reaction is obtained, sample material can be taken up on the needle and then used for further tests and determinations, i.e. as an inoculating needle.

The capillary is sealed at its open or free end by means of a wooden or plastic closure which is removable but which permits the formation of a sterile seal. The spherical bead or needle is introduced into the sample tube, followed by the necessary amount of dyestuff (tablet, powder, test strip) and the thusly prepared tubes are sealed with the suction bulb or plunger aspirator. The tubes are then in accordance with the invention sterilized as by autoclaving, or with heated air or gas or with suitable rays and in this form stored for use.

If a dyestuff impregnated test strip is used, there is preferably provided on the strip, one of the conventional indicators known for evidencing by a detectable change the sterility of the system. If the dyestuff to be used for the biological determination is introduced into the tube as a powder or tablet, then the sterility indicator can be separately provided, internally or externally as desired.

The invention will be further illustrated by the following example but it is not to be construed as in any way limitative of the scope thereof.

EXAMPLE

The micro test tube is made of glass. The capillary portion 1 has a length of 30 mm, a diameter of 3 mm and widens out to form a cylindrical tube 2 having a length of 60 mm and a diameter of 9 mm.

The sample tube 2 is sealed with a rubber aspirator 3. In the inside of the tube, there is provided a glass needle 4 having a length of 80 mm and a diameter of 5 mm (FIG. 1). In FIG. 2 in place of the needle, there is provided a glass bead 5 having a diameter of 5 mm and a pressure aspirator or plunger 3. The needle and sphere each serve to seal off the communicating passageway between the capillary 1 and the sample tube 2. The needle 4 is centered by means of a collar 6 made of an inert synthetic resin and is through this means held in a centered position in sample tube 2. The capillary 1 is sealed by means of a cap 7 made of a synthetic material. In FIG. 2, the seal 7 is one of a plurality of such caps constructed as a tray stand.

In the inside of the sample tube 2, there is contained the measured amount of dyestuff in this case applied onto a carrier 8.

For carrying out the test, the caps 7 and micro test tube are separated and by means of the aspirator 3, a predetermined amount of the fluid to be sampled drawn into the tube and the tube then remounted in the cap 7. The incubation is carried out in the known manner, the resulting reaction of the dyestuff with the bacteria providing a detectable color change which can be evaluated.

The reaction takes place in the case of methylene blue in a color change of the test strip from colorless to blue, in the case of Resazurine paper from red to blue and in the case of TTC of from red to colorless.

After the test has been completed, the aspirator 3 is removed, the tubes emptied and cleaned and made ready for reuse.

In order to be sure that the micro test tubes have been successfully sterilized, the sample tube 2 carries a special indicator 9. In the case of FIG. 1, this is located within the tube, while in the case of the embodiment of FIG. 2, it is externally mounted.

While the invention has been illustrated and described as embodied in a device for microbiological testing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A micro test tube adapted for use in microbiological determinations, comprising a capillary capable of forming a flow passage, the cross-sectional area of which at one end thereof increases to form a small generally cylindrical sample tube with a flow passage continuous with said capillary, first sealing means provided for sealing said capillary at its open end, second sealing means provided for sealing said sample tube at its open end, said second sealing means constituting aspiration means, said sample tube containing a movable needle having a length greater than that of said sample tube for sealing off said passage between said sample tube and said capillary and a dyestuff which undergoes a detectable change corresponding to a microbiological reaction.

2. A micro test tube according to claim 1, wherein said second sealing means is a synthetic or natural rubber aspirating bulb mounted externally on said open end of said sample tube.

3. A micro test tube according to claim 1, including an indicator for establishing sterility.

4. A micro test tube according to claim 1, wherein said indicator is externally carried.

5. A micro test tube according to claim 1, wherein a plurality of sealing caps are provided constructed as a flat platform having a row of caps arranged therein for permitting a plurality of said micro tubes to be sealed and to stand upright therein.

6. A micro test tube according to claim 1, wherein said sample tube and capillary are constructed of a transparent, inert material.

7. A micro test tube according to claim 1, wherein the capillary has a length of 25–50 mm and a diameter of 1–3 mm, the needle has a length of 60–80 mm and a diameter of 1.5–8 mm and the sample tube a length of 20–70 mm and a diameter of 5–10 mm.

* * * * *